Feb. 21, 1950 C. V. BOCCIARELLI 2,498,354

MAGNETIC LENS SYSTEM

Filed Dec. 3, 1946 2 Sheets-Sheet 1

INVENTOR.
CARLO V. BOCCIARELLI
BY
Ostrolenk & Faber
ATTORNEYS

MAGNETIC LENS SYSTEM

Filed Dec. 3, 1946 2 Sheets-Sheet 2

INVENTOR.
CARLO V. BOCCIARELLI
BY Ostrolenk & Faber
ATTORNEYS

Patented Feb. 21, 1950 2,498,354

UNITED STATES PATENT OFFICE 2,498,354

MAGNETIC LENS SYSTEM

Carlo V. Bocciarelli, Oxford, Pa., assignor to Philco Corporation, a corporation of Pennsylvania Application December 3, 1946, Serial No. 713,643

9 Claims. (Cl. 250—161)

This invention relates in general to electronic image systems and more particularly concerns apparatus for magnifying a television cathode ray tube display while effecting a substantial reduction in system power requirements.

In television and like image transmission and reproduction systems, the reconstituted image is generated upon the fluorescent screen of a cathode ray tube by an electron beam. The electron beam is intensity modulated in accordance with signals representing the instantaneous lights and shades of the transmitted image and deflected in a predetermined pattern in synchronism with a corresponding deflection at the image source. The deflection pattern most commonly used is such that the fluorescent spot formed by the impact of the electron beam upon the fluorescent screen traces out a substantially rectangular raster of closely spaced horizontal lines.

There are in use many electron beam deflection systems, most of which include orthogonally disposed electrostatic or electromagnetic field producing components energized from suitable deflection signal generators. In conventional present day television systems, the electron beam is swept horizontally 525 times during each thirtieth of a second to provide a single image frame. Interlaced line systems are generally incorporated but need not be discussed in connection with the present system.

A considerable number of design features enter into the problem of the selection of either an electrostatic or an electromagnetic deflection system for a particular television receiver. Both systems have numerous advantages and disadvantages and both are in widespread use.

In magnetic deflection cathode ray systems a deflection yoke comprising two orthogonally oriented coils is positioned upon the neck of the cathode ray tube between the electron gun and the fluorescent screen. These coils are energized from suitable, synchronized deflection signal generators. In order to obtain a linear sweep, the intensity of the magnetic deflecting field must be linearly increased, that is, the magnetic field intensity as a function of time must be "saw-tooth" in shape. As the magnetic deflecting field is a linear function of the deflection coil current, it follows that the coil currents must also be saw-toothed. The equivalent impedance of a deflection coil circuit includes resistance and inductance components which require that a fairly complex voltage waveform be applied thereto in order that the required saw-tooth of current be obtained.

The generator of this last mentioned waveform has a power requirement which is very considerable, particularly when the magnetic deflection field intensity must be sufficient to cause the electron beam to sweep through large deflection angles in the presence of high anode voltages. The power dissipated in the resistance component of the deflection circuit is proportional to the square of the deflection current, and consequently the power loss of a deflection circuit varies as the square of the deflection obtained upon the fluorescent screen of a given tube.

The power required by the horizontal deflection winding is, of course, much greater than that required by the associated vertical deflection means because of the much higher frequency of operation of the former. As a general rule the power requirements of deflecting circuits vary directly with the deflection frequency, and as a consequence the power requirements of horizontal deflection circuits have heretofore been excessively great, namely of the order of several hundred times those of vertical deflection circuits.

To illustrate the problems thus encountered in a modern "table model" television receiver, the horizontal deflection system may require twenty-five or more watts of high voltage anode power. In high-definition tri-color systems employing a high horizontal scanning frequency, seventy-five watts of anode power is not an uncommon requirement. In contrast to these excessive horizontal deflection power requirements, the low frequency vertical sweep circuits generally consume no more than one watt of anode power, and may require as little as one-tenth watt.

In terms of the entire television receiver, the horizontal deflection power may be about one-third of the total generated anode power, with all remaining circuits consuming the remaining two-thirds.

The present invention contemplates and has as a primary object the provision of a cathode ray tube deflection system which forms a large image while utilizing deflection circuit components of comparatively small size and power loss.

Essentially, the present television system utilizes a conventional cathode ray tube structure adapted for magnetic deflection, but energized from a deflection circuit of relatively low power such that if acting alone would produce a narrow rectangular raster at the center of the fluorescent screen. As will be described in greater detail hereinbelow, this raster is expanded by the use of a novel magnetic lens which establishes an unvarying magnetic field of predetermined configuration between the deflection means and the fluorescent screen. This magnetic lens, which may be constructed in various manners, as will be shown, has the important property of magnifying an electronic image in one direction, which property is employed to expand the horizontal deflection to obtain the desired large picture width over the full screen of the cathode ray tube.

In actual operation this magnetic lens compresses the vertical deflection somewhat while expanding the horizontal deflection, but this may readily be compensated by intensifying the comparatively small vertical deflection current. Since, as described above, the vertical deflection power is extremely small compared to the horizontal deflection power, such vertical compression is of little consequence in view of the extensive power economies effected in the horizontal circuit. In most receivers the vertical compression may be accomplished simply by adjustment of the "vertical sweep amplitude" control.

As mentioned above, the expansion of the electron image is accomplished through the use of a fixed magnetic field. Consequently, the magnetic lens may be created by an arrangement of permanent magnets which provide the enlarged image without the expenditure of power normally required to establish electrically a magnetic field.

With these general descriptive features in view, it is an object of this invention to provide a magnetic lens for a cathode ray tube which effectively reduces the power consumption of a deflection system for a particular image size.

Another object of this invention is to provide a novel structure of magnetic elements for establishing a field capable of magnifying an electron image.

A further object of the present invention is to provide means for magnifying the horizontal deflection of an electron beam in a television receiver tube without the consumption of power.

A still further object of this invention is to provide a cathode ray tube having a screen curvature particularly adapted for use with an image magnifying lens.

Another object of this invention is to provide a deflection system for a television cathode ray tube wherein magnetic deflection apparatus is used to obtain the required vertical sweep and a small fraction of the horizontal sweep.

These and other objects of the present invention will now become apparent from the following detailed specification when taken in connection with the accompanying drawings in which.

Figures 1, 2, 3, 5:
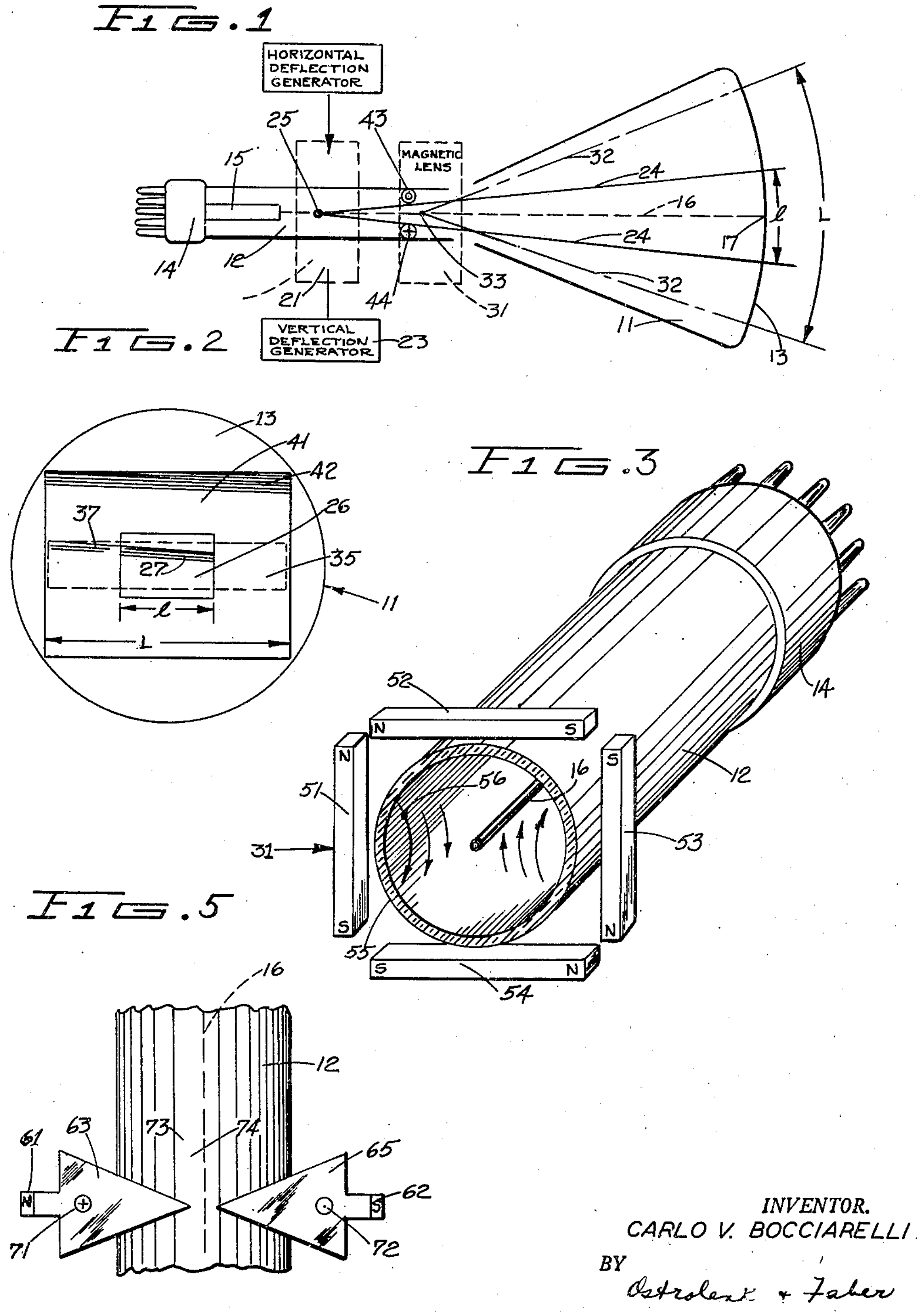
Figure 1 is a top view of a cathode ray tube used for discussion of the general principle and effects of the present invention.
Figure 2 is a front view of the screen of the cathode ray tube of Figure 1 and illustrates the image raster obtained thereon.
Figure 3 is a sectional view of a cathode ray tube and magnetic lens for accomplishing a horizontal deflection amplification.
Figure 5 is a top view of the magnetic lens and part of the cathode ray tube adjacent thereto illustrated in Figure 4.

Referring now to the drawings, and more particularly to Figures 1 and 2, there is shown a cathode ray tube 11 of the type ordinarily employed in television receiver practice for image reproduction. As is well known, a tube of this type comprises a glass or like envelope having a neck section 12 flaring at one end thereof to a screen 13. The inner surface of screen 13 is coated with a phosphor which emits light (fluorescence) upon the impact of an electron beam. Within tube 11, and just beyond base 14, is diagrammatically shown an electron gun 15 for generating an electron beam shown as broken line 16. The electron gun 15 may include means for focusing beam 16 to a sharply defined point 17 upon screen 13, or external magnetic means (not shown) may be employed to accomplish this end. These elements are well known and require no detailed description here.

For the cathode ray tube 11 shown in Figures 1 and 2, magnetic deflection is employed to sweep electron beam 16 such that fluorescent spot 17 traces a rectangular raster of substantially horizontal lines. To produce the final television image, the electron beam 16 is intensity modulated within electron gun 15 by means such as a control grid, the details of which are well known and accordingly have been omitted.

The magnetic deflection is preferably accomplished by a conventional type deflection yoke having two orthogonally disposed deflection coils and positioned about the neck 12 of tube 11, within the area enclosed by broken line 21. This area is located between the electron gun 15 and the fluorescent screen 13.

The horizontal and vertical deflection coils (not shown individually) are energized from horizontal and vertical deflection generators 22 and 23 respectively. As previously mentioned, these generators are required to provide a saw tooth of current in their respective deflection coils. The saw-tooth frequencies of the two coil currents are related and in a conventional "black and white" television receiver are 15,750 and 60 cycles per second in the horizontal and vertical circuits respectively providing an image of 525 lines per frame interlaced at 30 frames per second. For color television and high definition black and white images higher line frequencies are used.

To obtain a horizontal line on screen 13 which extends across the full face thereof at the frequencies mentioned above ordinarily predicates a deflection generator 22 of high power output, which may seriously limit performance since the combination of complex voltage wave form and high power is difficult to attain with little distortion.

In accordance with the principles of the present invention it is possible to operate horizontal deflection generator 22 at a low power level such that electron beam 16 is deflected horizontally between the limits designated by lines 24—24 in Figure 1. If no other deflecting influence is present the limits 24—24 of the beam 16 will center at a point 25 within the deflection area 21. The length of the horizontal sweep is designated as $l$ upon the face of the tube.

With both horizontal and vertical generators 22 and 23 in operation, a rectangular raster 26 will be obtained, as illustrated in Figure 2, formed of vertically displaced horizontal lines such as 27 of length $l$. The power requirement for a raster such as 26 which is small relative to tube size is comparatively simple to obtain.

Returning to consideration of Figure 1, there is shown an area 31 which forms a lens for the electron beam 16 and is capable of substantially enlarging the horizontal sweep appearing on screen 13 without change in horizontal deflection generator 22, and without the consumption of power. This lens 31, to be described in detail below, serves to amplify the horizontal sweep from the limits 24—24 to limits 32—32, shown by appropriate dot-dash lines, such, that the length of the horizontal sweep is equal to L and extends substantially across the entire tube face 13. The apparent center of the sweep with magnetic lens 31 in use is at a point such as 33 within the lens area.

It is thus apparent that the sweep amplification obtained is:

$$1-\frac{L}{l}$$

and that the power saving, which is proportional to the square of the sweep amplification as described above is:

$$2-L^2-l^2$$

In one practical system, the magnetic lens 31 may be used to amplify the horizontal sweep by a factor of four, thus reducing the power required of horizontal generator 22 by a factor equal to the difference of the squares of the horizontal sweep distances obtained by generator 22 and magnetic lens 31.

In Figure 2 the raster 35 illustrates the electron image upon screen 13 formed when the system previously described for obtaining small raster 26 is used with magnetic lens 31. This raster is composed of magnified horizontal lines 37 of length L, which due to the properties of lens 31 has been compressed so that the vertical deflection is less than that for raster 26. Therefore, in order to obtain a raster of conventional proportions having a horizontal length L, the power output of vertical deflection generator 23 is raised so that raster 35 is expanded into raster 41, made up of horizontal lines 42. This increase in power is small, and further is insignificant when compared to the savings in power and equipment cost in the horizontal deflection circuits.

Having discussed the advantageous results of the application of a magnetic lens to a horizontal sweep system, the lens itself will now be treated in detail.

In Figure 1, a deflection amplification from the limits 24—24 to limits 32—32 may be obtained by a magnetic field which is normal to the plane of the paper in the region 31. If the field is zero along the axis of the tube, then electron beam 16 will be undeflected when axial, as shown. If the field intensity is linearly increased from zero in region 31 in a direction transverse to the axis of tube neck 12, then sweep amplification of the type shown will be obtained provided that the direction of the field (namely whether it enters or extends from the sheet of Figure 1) is properly selected, and further, provided that the extent of the magnetic field axially along the tube is substantially constant in the lens area. In Figure 1, as we move upwards from the tube axis in region 31 the magnetic field must be directed out of the drawing and as we move down from the tube axis, the field must be directed into the drawing for proper lens operation. This is illustrated by the conventional symbols, a dot in a circle 43 and a cross in a circle 44 in Figure 1.

With reference now to Figure 3, there is shown a sectional view of the neck 12 of cathode ray tube 11 described in Figure 1, as viewed toward the tube base 14. The details of the electron gun and deflection system have been omitted in this drawing. Electron beam 16 is graphically shown and is directed outwards of the drawing toward the fluorescent screen of the tube.

Shown about the neck of the tube is a magnetic lens 31 having the general properties described immediately above. This embodiment of the lens consists of four bar magnets 51, 52, 53 and 54 disposed as the four sides of a rectangle in a plane normal to the tube axis. The magnets have been arranged so that the N and S poles of adjacent magnets are adjacent each other as shown. The structural arrangement for supporting magnets 51 through 54 has not been illustrated, but preferably permits magnet adjustment so that the desired field relation may be obtained experimentally. For further field adjustment, the bar magnets may have adjustable pole pieces. As illustrated the magnets are permanent bar magnets, but these, of course, may be replaced by electromagnets without affecting the novel results.

For a magnet arrangement as shown in Figure 3 the magnetic field produced thereby is of substantially constant axial thickness over the effective cross section of the tube neck 12. The field pattern in a transverse plane is illustrated by the arrowheads 55. This is a fixed field which due to the pole arrangement shown is zero in a vertical plane through the tube axis. To the right of the tube axis the field is directed upward, and to the left is directed downward. This corresponds to the field directions specified by symbols 43 and 44 in Figure 1. The vertical field intensity increases from zero at the center to maxima in opposite direction at the edges of the tube.

Thus, in operation, as the electron beam 16 is deflected horizontally by deflection means such as 22 in Figure 1, the beam is swept through the field 55 which in turn adds to the deflection. As the field increases in intensity from zero to a maximum in a horizontal plane, the deflection is uniformly increased to provide the expansion discussed in connection with Figure 1.

Due to the curvature of the field lines 55 as shown, the field will only be truly vertical in the horizontal plane through the tube axis. Out of this plane, such as at point 56, the field may be visualized as a large downwardly directed component and a small inwardly directed horizontal component. This latter component is operative to compress the vertical sweep in the manner shown for raster 35, Figure 2. However, as is readily apparent from Figure 3, the vertical component is considerably larger than the horizontal component, so that the horizontal amplification is greater than the vertical compression. In a particular experimental arrangement, an amplification of 4:1 was obtained horizontally while a compression of 2:1 appeared vertically. This compression is readily compensated by an increase in the vertical deflection generator power output, as above described.

Distortion limits the maximum amplification attainable. If very large amplifications are attempted, the raster appearing on the screen may no longer be perfectly rectangular as is raster 41 in Figure 2, but may exhibit some curvature. If the curvature is sufficient to be objectionable, it may be corrected by means already employed in the correction of such common image distortions as "pin-cushioning" or "barrelling."

As mentioned in connection with Figure 1, a magnetic lens (such as the type shown in Figure 3) changes the apparent center of deflection. It is therefore preferable that the screen 13 of the cathode ray tube 11 be substantially spherical and be centered at the apparent center 33 (Figure 1) in order to preclude spot defocusing in the course of the beam sweep.

Figures 4, 6:
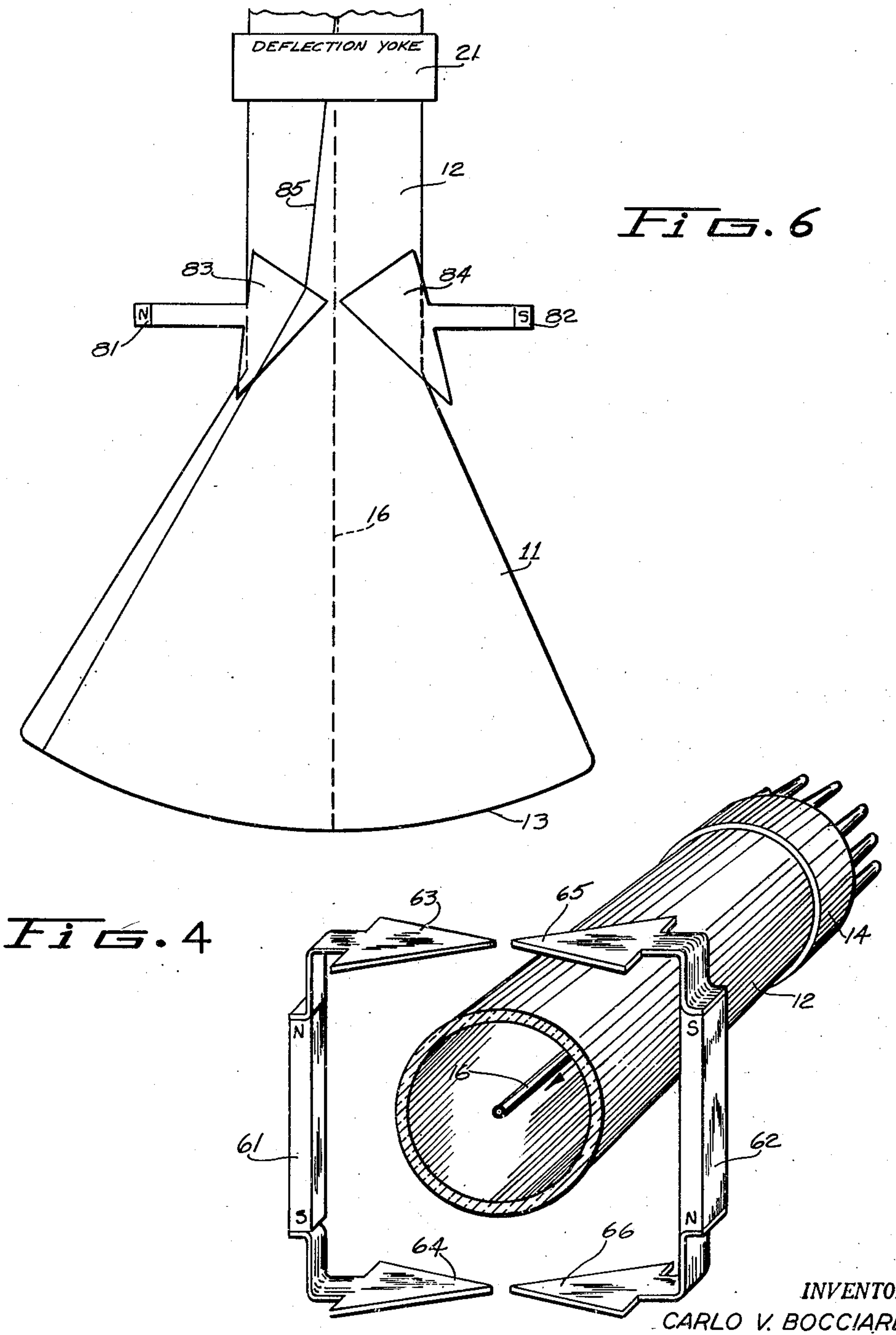
Figure 4 is a general perspective view, partly in section, of a cathode ray tube and another embodiment of a magnetic lens system for obtaining horizontal deflection amplification.
Figure 6 is a top view of a still further embodiment of a magnetic system for accomplishing horizontal deflection amplification.

Referring now to Figures 4 and 5, there is shown another embodiment of a magnetic lens for accomplishing the horizontal amplification discussed above. That portion of the cathode ray tube shown in Figure 3 has also been shown in Figure 4. The deflection yoke has been omitted along with the front of the tube. The electron beam 16 is shown as axial and directed toward the tube face.

The magnetic lens comprises a pair of bar magnets 61 and 62 which may be of permanent or electromagnet types, having pole pieces 63, 64, 65 and 66 respectively which are formed of magnetic material in the shape of arrows with shafts bent at right angles, as shown. The pole pieces 63 through 66 inclusive are secured to magnets 61 and 62 in any suitable manner, and these magnetic elements are disposed about the neck 12 of the cathode ray tube by supporting means (not illustrated). It is preferable to have magnets 61 and 62 and their respective pole pieces adjustable toward or away from each other for adjustment.

The operation of the magetic system shown in Figure 4 is best described in connection with Figure 5 which is a top view of the tube neck 12 and the magnet poles. To the left of the tube axis, the magnetic field through the tube is directed downwardly, and to the right, upwardly as shown by symbols 71 and 72 respectively. In a horizontal plane through the tube, the field is substantially triangular in shape on either side of the tube axis, since the field is defined by triangular pole pieces.

As shown in Figure 4, the pole pieces 63—66 are of uniform thickness, and as a result the flux density at any point within the area of the field is reasonably constant. When the electron beam 16 is axial as shown by the broken line in Figure 5, it passes through a region of zero field. However, as electron beam 16 is swept by deflection means (not shown) through the triangular field, the field causes further deflection of the beam. The extent of this further deflection is dependent upon the time during which the beam 16 is in the field, and therefore as is made clear in Figure 5, a large initial deflection, such as represented by line 73, traverses a longer section of the magnetic field and is deflected more than a smaller initial deflection as represented by line 74. This "spreading" or amplification of the sweep occurs on both sides of the tube axis and provides a raster which is considerably enlarged horizontally.

For the magnetic structure shown in Figures 4 and 5, the field through the tube is substantially vertical throughout. As a result the vertical deflection is not substantially affected. As a further consequence of the substantially uniform field, the distortion of the raster from rectangular is negligible.

Referring now to Figure 6, there is shown a cathode ray tube 11, as in Figure 1, which includes a deflection yoke 21, and means (not shown) for generating an electron beam 16 directed at screen 13. Disposed about the neck 12 of the cathode ray tube is a magnetic structure of the same general type shown in Figures 4 and 5. This magnetic system includes a pair of vertically disposed bar magnets 81 and 82 to which are suitably secured pole pieces 83 and 84 respectively. For each magnet, pole pieces are provided above and below the tube neck 12 as in the example of Figure 4.

The essential difference between the embodiments of Figure 4 and Figure 6 resides in the shape of pole pieces 83 and 84. These pole pieces are triangular as in Figure 4, but are extended outwardly in the direction of the screen 13. This non-symmetrical shape permits better usage of the triangular magnetic fields, as is particularly demonstrated by electron beam path 85. Thus, the beam, as deflected to the left by yoke 21, traverses a comparatively long section of magnetic field under pole piece 83 providing considerable amplification. Distortion is maintained at a minimum by means of these enlarged pole pieces, 83 and 84, since a large proportion of the total flux traverses the tube in substantially straight vertical lines. Further, the vertical compression due to non-vertical field components is negligible for a magnetic lens of this type.

In summary, the magnetic lens systems described above expand the horizontal sweep of a television receiver tube without the expenditure of power. The lens may comprise a field established solely by permanent magnets requiring only initial adjustment. Although this expansion may be accompanied by vertical compression of small extent, this may be readily corrected with negligible power and difficulty.

It is apparent that the general lens systems described above may be applied to numerous other cathode ray tube image systems, and that various modifications and extensions of the principles set forth may be made by those skilled in the art. Accordingly, it is preferred that the spirit and scope of this invention be limited solely by the appended claims.

I claim:

1. A magnetic lens for amplifying a cathode ray tube image display comprising at least one magnet having oppositely disposed triangular pole pieces substantially parallel to each other, said pole pieces being positioned oppositely of said cathode ray tube.

2. A magnetic lens for amplifying a cathode ray tube image display comprising, two permanent bar magnets disposed oppositely of said cathode ray tube, said magnets having substantially triangular shaped pole pieces at each end thereof extending normally of said magnets and over said cathode ray tube.

3. In a television system, a cathode ray tube having a fluorescent screen and means for generating an electron beam and impinging said beam upon said screen, magnetic deflection means associated with said cathode ray tube and energized for deflecting said electron beam to form a substantially rectangular raster of vertically displaced horizontal lines upon said fluorescent screen, means for amplifying the horizontal dimension of said raster including a magnetic field of substantially uniform density and confined to an area of triangular cross-section having only a vertical component of direction extending through said cathode ray tube.

4. In a television system, a cathode ray tube having a fluorescent screen and means for generating an electron beam and impinging said beam upon said screen, magnetic deflection means associated with said cathode ray tube and energized for deflecting said electron beam to form a substantially rectangular raster of vertically displaced horizontal lines upon said fluorescent screen, means for amplifying the horizontal dimension of said raster including a magnetic field of substantially uniform density and confined to an area of triangular cross-section having only a vertical component of direction extending through said cathode ray tube, said vertical component being zero along the axis of said tube and of opposite direction on either side of said tube axis.

5. In a cathode ray tube having a screen, a source of electrons arranged to be impinged on said screen, means for deflecting said electrons in one dimension of said screen and magnetic means for establishing a magnetic field of substantially uniform density in the path of said electrons, the area of said field being such that said said electrons remain in said field for different lengths of time depending on the extent of deflection of said electrons by said first means.

6. In a cathode ray tube having a screen, a source of electrons arranged to be impinged on said screen, means for deflecting said electrons in one dimension of said screen and magnetic means for establishing a magnetic field, the depth of said field varying linearly from adjacent the axis of said tube radially away from the axis so that electrons deflected to the periphery of the tube remain in the field longer than electrons nearer the axis of the tube.

7. In a cathode ray tube having a screen, a source of electrons arranged to be impinged on said screen, means for deflecting said electrons, and magnetic means for establishing a magnetic field of substantially uniform density in the path of said electrons, the length of the field in the path of said electrons varying in accordance with the extent of deflection of said electrons.

8. In a cathode ray tube having a screen, a source of electrons arranged to be impinged on said screen, means for deflecting said electrons, and magnetic means for establishing a magnetic field of substantially uniform density in the path of said electrons, the length of the field in the path of said electrons increasing with the angle of deflection of said electrons.

9. In a cathode ray tube having a screen, a source of electrons arranged to be impinged on said screen, means for deflecting said electrons, and a pair of magnets each having a pair of pole pieces of magnetic material located on opposite sides of said tube, the pole pieces of one magnet being in opposed relation with the corresponding pole piece of the other of said magnets, the dimension of said pole pieces in the longitudinal direction at successive points of said tube varying in accordance with the distance of said power from the central axis of said tube.

CARLO V. BOCCIARELLI.

REFERENCES CITED

The following references are of record in the file of this patent:

UNITED STATES PATENTS

| Number | Name | Date |
|---|---|---|
| 1,985,093 | Hehlgans | Dec. 18, 1934 |
| 1,995,376 | Campbell | Mar. 26, 1935 |
| 2,177,688 | Cawein | Oct. 31, 1939 |